United States Patent

[11] 3,591,262

[72] Inventor Paul Frederic Marie Gambs
140, rue Maznod, Lyon, 2e (Rhone), France
[21] Appl. No. 795,200
[22] Filed Jan. 30, 1969
[45] Patented July 6, 1971
[32] Priority Mar. 13, 1968
[33] France
[31] 49,761

[54] OPTICAL APPARATUS FOR REGULATING THE COMBINATION AND SEPARATION OF REFLECTED LUMINOUS BEAMS
10 Claims, 5 Drawing Figs.

[52] U.S. Cl. .................................................. 351/14, 351/16
[51] Int. Cl. .................................................. A61b 3/10
[50] Field of Search .................................... 351/14, 7, 15, 16; 95/11 EM

[56] References Cited
FOREIGN PATENTS
1,003,260 9/1965 Great Britain ............... 351/14
1,069,407 5/1967 Great Britain ............... 351/14

*Primary Examiner*—David Schonberg
*Assistant Examiner*—Paul A. Sacher
*Attorney*—Waters, Roditi, Schwartz and Nissen ABSTRACT: An optical system for combining or dividing two light beams for constant illumination of an image for observation and for instantaneous illumination for its photographic recording, excludes a reflecting member at the intersection of the beams. The system is of particular value in an ocular biomicroscope to combine beams from a flashing light source with that from a constant light source to provide a flat beam projected into the eye forming an image of a slit. The system also separates the beam from the image into two beams of appropriate intensities for viewing and recording respectively. The reflecting member for combining beams is a rectangular prism with a narrow, rectangular, inner totally reflecting inclined surface engaging only a part of the nonreflected beam. The reflecting surface for separating two beams is of elliptical shape. A partially reflecting surface in the prism can be moved into position replacing the totally reflecting surface and engaging the whole beam. The composite beam is a central flat beam from the flashing source and a beam separated into two lateral beams from the constant source, fused accurately in the slit image by the objective. A collecting lens is interposed between the reflecting surface and the slit.

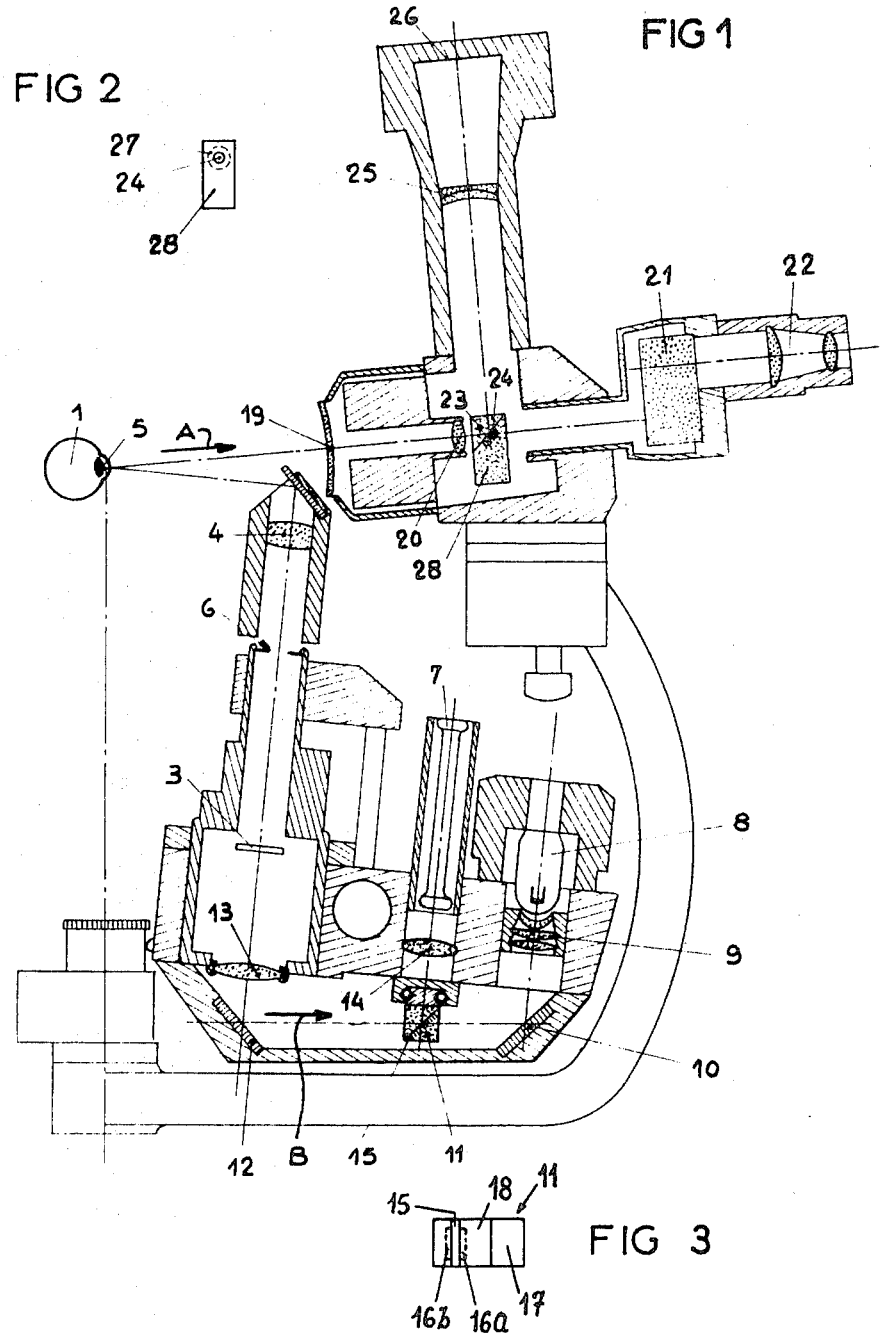

OPTICAL APPARATUS FOR REGULATING THE COMBINATION AND SEPARATION OF REFLECTED LUMINOUS BEAMS

This invention relates to a system and device for combining or dividing two optical beams.

The addition of a system of recording (photography, cinematography, etc.) or of retransmission (television) to a system of observation (telescope, filed glasses, microscope, etc.) or so-called reflex viewers is generally done by the interposition into the path of the light rays which traverse the principal system, of a movable reflecting element or fixed semireflecting element, inclined so as to cause either the deflection of the beam, or its division in order to form a second beam of light rays similar to the first, but spacially displaced.

A similar system is used in reverse manner also to produce, where required, and in particular in the case of microphotography, the combination of a permanent illuminating means used during observation and during focusing and of a special illuminating means for the recording of the image (flashbulb in particular).

The movable reflector system has obviously the drawback of being complex and cause a flickering of the observed image.

The fixed semireflector system has obviously the drawback of a loss of light which, for certain applications, is unacceptable. In fact, this loss of light acting as a filter does not dispense with the need to stop down or narrow the recording light beam to obtain a sufficient depth of field, while the eye of the observer obtains this depth by accommodation. The solution which consists of sacrificing the observation for the benefit of the recording by adopting a coefficient of reflection different by 50 percent is not acceptable either in certain cases where it renders precise focusing impossible.

It is an object of the present invention to obviate the aforesaid drawbacks.

According to the invention there is provided a method for the combination or division of two optical beams intended, one for the permanent illumination of an image for the observation of this image and the other for the instantaneous illumination of this image for its either photographic or cinematographic recording.

This method consists of arranging at the point of convergence or of separation of two optical beams a reflecting element of which the surface is a regular portion of the nonreflected section of the beam, this element being inclined so as to deflect the reflected beam into the axis of the nonreflected beam, at the point of combination of the two beams, and to deflect the reflected beam into a different direction from that of the nonreflected ray, at the point of separation of the beams, this reflecting element thus ensuring the stopping down or narrowing of the reflected beam which is, on that account, intended for the instantaneous lighting or for the recording of the image, while the other beam is intended for the permanent illumination or for the observation of this image.

According to another aspect of this invention a device for the operation of this method is constituted by an optical element comprising a totally reflecting surface which occupies geometrically only a part of the cross section of the total emergent of incident beam.

In one simple embodiment of the invention, this device is constituted by a rectangular prism on the inside of which is inserted an inclined reflecting surface.

Advantageously, especially in the case where this process is applied to a photographic ocular biomicroscope with slit lamp, the device used for the combination of the optical beams comprises a reflecting surface of rectangular profile of very small width and that used for the separation of optical beams comprises a reflecting surface of elliptic profile.

Advantageously, the slit lamp comprises a collecting lens interposed between the inclined reflecting surface and the slit, in such manner that this latter is situated at least approximately at the site of the collecting lens.

In order that the invention may be more fully understood, an embodiment of a device incorporating a system according to the invention is described below, purely by way of an illustrative but nonlimiting example, with reference to the accompanying drawing, in which:

FIG. 1 is a side view in axial section of an ocular biomicroscope, with a slit lamp, and equipped with an embodiment of a device employing systems according to the invention;

FIG. 2 is a view along the arrow A of FIG. 1 of the device according to the invention, used for the separation of the optical beams in the microscope;

FIG. 3 is a view along the arrow B of FIG. 1 of the device according to the invention, used for the combination of the optical beams, in the slit lamp.

Figure 4:
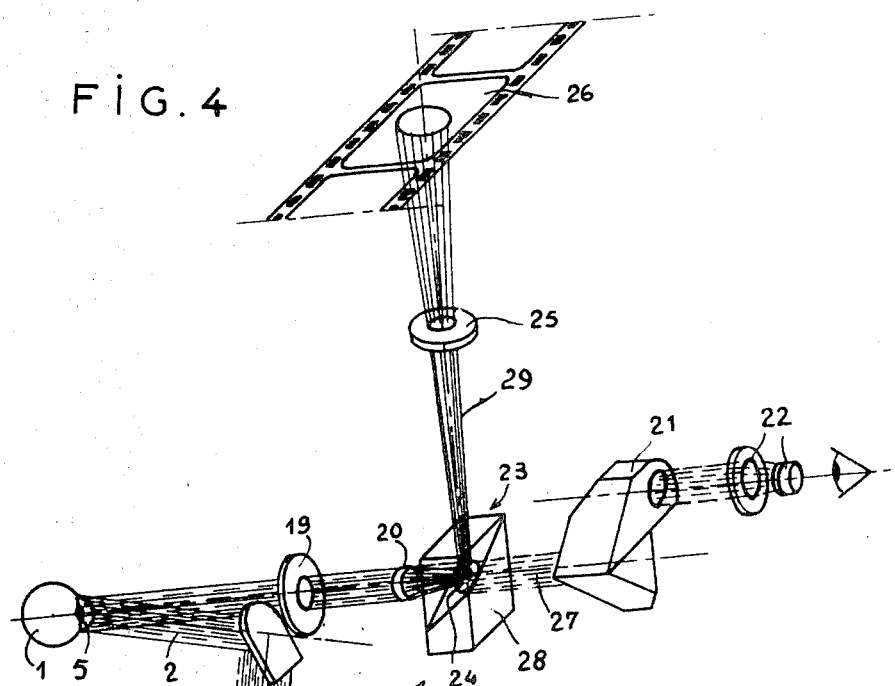
FIG. 4 is a diagrammatic perspective view illustrating the operating principle of the ocular biomicroscope with the slit lamp of FIG. 1.
Figure 5:
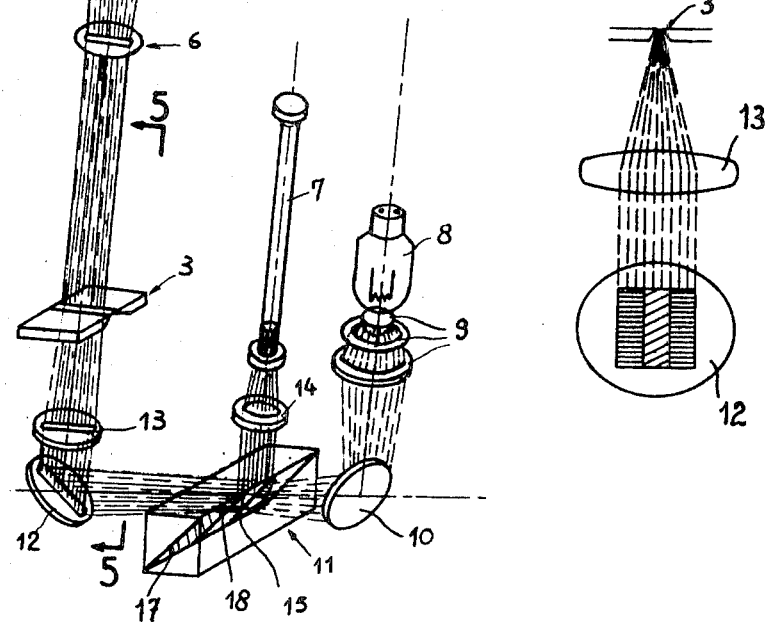

Referring first to FIG. 4, as in all biomicroscopes, the slit lamp projects into the examined eye 1 a flat light beam 2 emerging from a slit 3 which determines in the optical media of the eye an optical section which is examined with the aid of the microscope. The latter possesses a photographic device.

The flat light beam 2 emerging from the slit 3 is focused in the optical media of the eye by the objective 4 which forms the image 5 of the slit 3. As is seen, in FIG. 4, the optical section observed is in reality the volume of the optical media bounded by light rays which join the edges of the image of slit 5 at the edges of the free opening of the objective 4. But the sharpness of this optical section is inversely proportional to its thickness. In the immediate neighborhood of the image 5 of the slit, this thickness can be easily controlled by acting on the adjustable width of the slit 3. It is not the same either when spaced more in front or behind the slit image 5, since then the light beam takes a form of which the cross section tends to approximate to that of the objective 4. To limit this drawback, the slit lamp is provided with a rectangular diaphragm 6 the slit of which is longitudinally parallel to the slit 3, so that the light beam preserves a rectangular cross section. Nonetheless, it remains necessary to accept a compromise between the reduction of lighting and the gain in depth of field resulting from the interposition of the diaphragm 6.

However, it may be noted that observation is less demanding in depth of field than photography, by reason of the possibility of exploring the various portions of the eye with a distinct section of limited extend, while photography necessitates representation in a single image of satisfactory distinctness an optical section extending for example across the whole crystalline lens of the eye.

For flash photography, the invention supplies a solution to the problem of the combination of light beams emerging from one part of the permanent luminous source of observation 8 and on the other hand, of the flashing light 7, by effecting in the resulting common beam, at each of these beams a shape and a position corresponding to the requirements of their own use.

As regards the microscope, the invention supplies also the solution of the same problem. The microscope is focused in principle, on a well determined plane, buy by reason of its accommodation of the limit of separating power and of visual acuity, there is in reality in the object space a volume of a certain depth which is sharply seen by the eye of the observer, If it is desired that the recorded image restore at least the quality of the observed image, it is necessary to be sure that the depth of filed of the beam directed towards the receiver is greater than that of the beam directed towards the observer.

There also, the invention ensures the separation of the two beams in a manner which corresponds perfectly to the requirements of their own use.

In the apparatus shown, the invention is realized in the following manner:

The slit lamp comprises:

A. a permanent light source 8 which, through the condenser 9, the mirror 10, the parallel faced prism 11, a second mirror 12 and a collector 13 illuminates the slit 3 from which the objective 4 forms the sharp image 5 in the examining eye. The diaphragm 6 gives the beam projected into the eye a rectangular section.

B. a flashbulb 7 of which the luminous flux projected through the condenser 14 is reflected on an inclined surface 15, contained in the prism 11 to follow then the same path as the emergent beam from the permanent source 8. According to the invention, the reflecting surface 15 only obturates a central portion of the cross section of the permanent lighting beam. For this application, the subdivision is done in the form of 3 parallel bands, that is to say a central band 15 for the flashlamp framed by two side bands 16a and 16b for focusing.

Moreover, the slit 3 is placed substantially at the focal point of the collector 13 so that the light rays which can pass through the slit 3 when it is adjusted to be very narrow through the prism 11 parallel to a median plane passing through the optical axis and through the slit, this arrangement having the effect of producing a flat light beam of rectangular section from a reflecting surface 15 with parallel edges, without the inclination of the said reflecting surface 15 introducing a distortion of the section of the said beam.

Additionally, the prism 11 can occupy two other positions. The prism 11 is slidably supported for bringing into the beam: either a half-silvered zone 17, for photographs other than in optical section, or for observations with light reduced by 50 percent, or the zone 18 completely transparent for observations with full illumination, without photography, or for cinema by boosting the intensity of the permanent source 8.

The microscope comprises: Behind an optical protecting glass 19, a revolving turret with two paris of objectives 20, a pair of systems of prisms 21 an eyepieces 22 constituting a conventional stereo-microscope. Behind the objectives of the left half-microscope is interposed the parallel-faced prism 23 enclosing the reflecting surface 24 which according to the invention directs beam 29 through the lens 25 on to the receiver 26, which beam 29 is the central portion of the beam directed at surface 24, while the peripheral portion continues to be directed towards the eye of the observer. In this application, the subdivision is effected concentrically with the optical axis, the beam 29 being directed towards the receiver 26 having a solid round section, of small diameter and the beam surrounding the beam directed at surface 24 being directed towards the observer of annular section.

There again, to effect pure observations without recording, with full illumination, the reflecting surface 24 must by shifted by making the prism 23 slide so that the light beam passes directly through the free portion 28 to go entirely towards the left eye of the observer.

The right semimicroscope comprises a fixed plate with compensating parallel faces, of the same thickness as the prism 23.

It will be understood that various changes and modifications may be made in the embodiments described without departing from the essential concept of the invention as defined in scope by the appended claims.

I claim:

1. An optical system for observation and photography, said system comprising: a permanent illumination source for providing a prolonged optical beam; a flashing illumination source for providing an instantaneous optical beam; first means for directing said instantaneous optical beam at said prolonged optical beam to intersect and combine therewith; second means for directing the combined prolonged and instantaneous optical beams in a prescribed common path; said first means including two spaced at least partially transparent elements, and a reflecting element interposed therebetween, said reflecting element being adapted for reflecting said instantaneous optical beam in a prescribed direction and for dividing said prolonged optical beam into two spaced prolonged beams passing one through one of each of said transparent elements in said prescribed direction, to them combine with said reflected instantaneous optical beam, said reflected instantaneous optical beam thereby constituting the central portion of the combined beam; and third means in said prescribed path for receiving the combined beam; said third means including an inner reflecting portion, and an outer portion being at least partially transparent, said inner portion being adapted for separating and reflecting said central portion from the combined beam to provide instantaneous illumination for photography, and said outer portion being adapted for transmitting the prolonged illumination of the remaining portion of the combined beam to an observer.

2. A system as claimed in claim 1, wherein said reflecting element of said first means includes a surface which is inclined relative to the path of optical reflection of the instantaneous beam reflected thereby.

3. A system as claimed in claim 1, wherein said inner reflecting portion of said third means includes a surface which is inclined relative to the path of optical reflection of the instantaneous beam reflected thereby.

4. A system as claimed in claim 2, wherein said surface of said reflecting element of said first means is rectangular having a length, and a width being substantially smaller than said length.

5. A system as claimed in claim 3, wherein said surface of said inner reflecting portion of said third means is elliptical.

6. A system as claimed in claim 1, wherein said first means and said third means each include a respective prism of rectangular cross section internally of each of which is supported said reflecting element and said inner reflecting portion respectively.

7. A system as claimed in claim 1, wherein each said prism is slidably supported for removing the reflective surfaces of said first and third means from the path of the beams, and each said prism includes a partially transparent surface movable into the path of the beams to replace the reflecting surfaces of said first and third means.

8. A system as claimed in claim 4, wherein each of said partially transparent elements of said first means are rectangular and are operatively associated with the rectangular reflecting element interposed therebetween for combining said instantaneous and prolonged beams into a combined rectangular beam.

9. A system as claimed in claim 8, wherein said second means includes focusing means for accurately fusing said central portion of the combined beam with the outer portions thereof into a combined narrow rectangular beam.

10. A system as claimed in claim 9, wherein said second means includes a slit adjusting means spaced opposite said focusing means at the focal point thereof for adjusting the width of said combined narrow rectangular beam passing therethrough.